US007042898B2

(12) United States Patent
Blightman et al.

(10) Patent No.: US 7,042,898 B2
(45) Date of Patent: May 9, 2006

(54) REDUCING DELAYS ASSOCIATED WITH INSERTING A CHECKSUM INTO A NETWORK MESSAGE

(75) Inventors: Stephen E. J. Blightman, San Jose, CA (US); Laurence B. Boucher, Saratoga, CA (US); Peter K. Craft, San Francisco, CA (US); David A. Higgen, Saratoga, CA (US); Clive M. Philbrick, San Jose, CA (US); Daryl D. Starr, Milpitas, CA (US)

(73) Assignee: Alacritech, Inc., San Jose, CA (US)

( * ) Notice: Subject to any disclaimer, the term of this patent is extended or adjusted under 35 U.S.C. 154(b) by 1095 days.

(21) Appl. No.: 09/802,426

(22) Filed: Mar. 9, 2001

(65) Prior Publication Data

US 2001/0036196 A1 Nov. 1, 2001

Related U.S. Application Data

(63) Continuation-in-part of application No. 09/464,283, filed on Dec. 15, 1999, now Pat. No. 6,427,173, which is a continuation-in-part of application No. 09/439,603, filed on Nov. 12, 1999, now Pat. No. 6,247,060, application No. 09/802,426, which is a continuation-in-part of application No. 09/384,792, filed on Aug. 27, 1999, now Pat. No. 6,434,620, and a continuation-in-part of application No. 09/067,544, filed on Apr. 27, 1998, now Pat. No. 6,226,680.

(60) Provisional application No. 60/098,296, filed on Aug. 27, 1998, and provisional application No. 60/061,809, filed on Oct. 14, 1997.

(51) Int. Cl.
    *H04L 12/56* (2006.01)

(52) U.S. Cl. ....................... 370/463; 370/469
(58) Field of Classification Search ................. 370/389, 370/463, 465, 469, 474; 709/250, 230, 238; 714/807
See application file for complete search history.

(56) References Cited

U.S. PATENT DOCUMENTS

| 4,336,538 A | 6/1982 | Radford ....................... 364/200 |
| 4,991,133 A | 2/1991 | Davis et al. ................. 364/900 |

(Continued)

FOREIGN PATENT DOCUMENTS

| WO | WO98/19412 | 5/1998 |
| WO | WO98/50852 | 11/1998 |

(Continued)

OTHER PUBLICATIONS

Ross et al. "FX1000: A High Performance Single Chip Gigabit Ethernet NIC". IEEE Feb. 23–26, 1997. pp. 218–223.*

(Continued)

*Primary Examiner*—Chi Pham
*Assistant Examiner*—Derrick W Ferris
(74) *Attorney, Agent, or Firm*—Silicon Edge Law Group LLP; T. Lester Wallace; Mark Lauer

(57) ABSTRACT

A first partial checksum for the header portion of a TCP header is generated on an intelligent network interface card (INIC) before all the data of the data payload of the TCP message has been transferred to the INIC. A pseudopacket with the first partial checksum and the data is assembled in DRAM on the INIC as the data arrives onto the INIC. When the last portion of the data of the data payload is received onto the INIC, a second partial checksum for the data payload is generated. The pseudopacket is read out of DRAM for transfer to a network. While the pseudopacket is being transferred, the second partial header is combined with the first partial header and the resulting final checksum is inserted into the pseudopacket so that a complete TCP packet with a correct checksum is output from the INIC to the network.

7 Claims, 3 Drawing Sheets

U.S. PATENT DOCUMENTS

| | | | |
|---|---|---|---|
| 5,056,058 A | 10/1991 | Hirata et al. | 364/900 |
| 5,058,110 A | 10/1991 | Beach et al. | 370/85.6 |
| 5,097,442 A | 3/1992 | Ward et al. | 365/78 |
| 5,163,131 A | 11/1992 | Row et al. | 395/200 |
| 5,212,778 A | 5/1993 | Dally et al. | 395/400 |
| 5,280,477 A | 1/1994 | Trapp | 370/85.1 |
| 5,289,580 A | 2/1994 | Latif et al. | 395/275 |
| 5,303,344 A | 4/1994 | Yokoyama et al. | 395/200 |
| 5,412,782 A | 5/1995 | Hausman et al. | 395/250 |
| 5,448,566 A | 9/1995 | Richter et al. | 370/94.1 |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,517,668 A | 5/1996 | Szwerinski et al. | 395/800 |
| 5,541,920 A * | 7/1996 | Angle et al. | 370/429 |
| 5,548,730 A | 8/1996 | Young et al. | 395/800 |
| 5,566,170 A | 10/1996 | Bakke et al. | 370/60 |
| 5,588,121 A | 12/1996 | Reddin et al. | 395/200.15 |
| 5,590,328 A | 12/1996 | Seno et al. | 395/675 |
| 5,592,622 A | 1/1997 | Isfeld et al. | 395/200.02 |
| 5,598,410 A | 1/1997 | Stone | 370/469 |
| 5,629,933 A | 5/1997 | Delp et al. | 370/411 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 395/831 |
| 5,692,130 A | 11/1997 | Shobu et al. | 395/200.12 |
| 5,699,317 A | 12/1997 | Sartore et al. | 365/230.06 |
| 5,701,434 A | 12/1997 | Nakagawa | 395/484 |
| 5,701,516 A | 12/1997 | Cheng et al. | 395/842 |
| 5,749,095 A | 5/1998 | Hagersten | 711/141 |
| 5,751,715 A | 5/1998 | Chan et al. | 370/455 |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,771,349 A | 6/1998 | Picazo, Jr. et al. | 395/188.01 |
| 5,790,804 A | 8/1998 | Osborne | 395/200.75 |
| 5,794,061 A | 8/1998 | Hansen et al. | 395/800.01 |
| 5,802,580 A | 9/1998 | McAlpine | 711/149 |
| 5,809,328 A | 9/1998 | Nogales et al. | 395/825 |
| 5,812,775 A | 9/1998 | Seeters et al. | 395/200.43 |
| 5,815,646 A | 9/1998 | Purcell et al. | 395/163 |
| 5,878,225 A | 3/1999 | Bilansky et al. | 395/200.57 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,991,299 A | 11/1999 | Radogna et al. | 370/392 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,021,446 A | 2/2000 | Gentry, Jr. | 709/303 |
| 6,026,452 A | 2/2000 | Pitts | 710/56 |
| 6,034,963 A | 3/2000 | Minami et al. | 370/401 |
| 6,044,438 A | 3/2000 | Olnowich | 711/130 |
| 6,047,356 A | 4/2000 | Anderson et al. | 711/129 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,141,705 A | 10/2000 | Anand et al. | 710/15 |
| 6,173,333 B1 * | 1/2001 | Jolitz et al. | 709/240 |
| 6,226,680 B1 | 5/2001 | Boucher et al. | 709/230 |
| 6,246,683 B1 | 6/2001 | Connery et al. | 370/392 |
| 6,247,060 B1 | 6/2001 | Boucher et al. | 709/238 |
| 6,345,301 B1 | 2/2002 | Burns et al. | 709/230 |
| 6,356,951 B1 | 3/2002 | Gentry, Jr. | 709/250 |
| 6,389,468 B1 | 5/2002 | Muller et al. | 709/226 |
| 6,427,169 B1 | 7/2002 | Elzur | 709/224 |
| 6,434,651 B1 | 8/2002 | Gentry, Jr. | 710/260 |
| 6,449,656 B1 | 9/2002 | Elzur et al. | 709/236 |
| 6,453,360 B1 | 9/2002 | Muller et al. | 709/250 |
| 2001/0004354 A1 | 6/2001 | Jolitz | |
| 2001/0025315 A1 | 9/2001 | Jolitz | |

FOREIGN PATENT DOCUMENTS

| | | |
|---|---|---|
| WO | WO99/04343 | 1/1999 |
| WO | WO 99/65219 | 6/1999 |
| WO | WO 00/13091 | 3/2000 |
| WO | WO 01/04770 A2 | 7/2000 |
| WO | WO 01/05107 A1 | 7/2000 |
| WO | WO 01/05116 A2 | 7/2000 |
| WO | WO 01/05123 A1 | 7/2000 |
| WO | WO 01/40960 A1 | 7/2001 |

OTHER PUBLICATIONS

U.S. Appl. No. 08/964,304, Napolitano, et al.

Article by D. Hitz, et al., "File System Design For An NFS File Server Appliance", 13 pages, 1996.

Adaptec Press Release, "Adaptec Announces EtherStorage Technology", 2 pages, May 4, 2000, printed Jun. 14, 2000.

Adaptec article, "EtherStorage Frequently Asked Questions," 5 pages, printed Jul. 19, 2000.

Adaptec article, "EtherStorage White Paper," 7 pages, printed Jul. 19, 2000.

CIBC World Markets article by J. Berlino et al., "Computers; Storage", 9 pages, dated Aug. 7, 2000.

Merrill Lynch article by S. Milunovich, "Storage Futures", 22 pages, dated May 10, 2000.

Article by S. Taylor entitled "Montreal start–up battles data storage bottleneck," dated Mar. 7, 2000.

Internet–draft of J. Satran, et al., "SCSI/TCP (SCSI over TCP)", 38 pages, dated Feb. 2000.

Internet pages entitled: Comparison of Novell Netware and TCP/IP Protocol Architectures, by Janique S. Carbone, 19 pages, Jul. 16, 1995, downloaded and printed Apr. 10, 1998.

Internet web pages from "Adaptec.com" website directed to the Adaptec, AEA–7110C iSCSI Host Bus Adapter and about Adaptec's IP storage activities, 11 pages, downloaded and printed Oct. 1, 2001.

Internet web pages from "iSCSIhba.com" website directed to JNI iSCSI HBAs including the "FCE–3210/6410", 10 pages, downloaded and printed Oct. 1, 2001.

Internet web pages from the "iSCSI Storage.com" website that mention an Emulex HBA, 2 pages, downloaded and printed Oct. 1, 2001.

Internet web pages from the "iSCSIhba.com" website that mention QLogic HBAs including the "SANblade 2300 Series", 8 pages, downloaded and printed Oct. 1, 2001.

"Two–Way TCP Traffic over Rate Controlled Channels: Effects and Analysis", IEEE Transactions on Networking, vol. 6, No. 6, pp. 729–743 (Dec. 1998).

Andrew S. Tanenbaum, Computer Networks, Third Edition, 1996, ISBN 0–13–349945–6. (entire book).

Jato Technologies Internet pages entitled: Network Accelerator Chip Architecture (twelve–slide presentation), 13 pages, printed Aug. 19, 1998.

EETIMES article entitled: Enterprise system uses flexible spec, by Christopher Harrer and Pauline Shulman, dated Aug. 10, 1998, Issue 1020. 3 pages, printed Nov. 25, 1998.

Internet pages entitled: iReady About Us and iReady Products. 5 pages, printed Nov. 25, 1998.

Internet pages entitled: Smart Ethernet Network Interface Card (which Berend Ozceri is developing). 2 pages, printed Nov. 25, 1998.

Internet pages entitled : Hardware Assisted Protocol Processing (which Eugene Feinberg is working on). 1 page, printed Nov. 25, 1998.

Internet pages of XaQti Corporation entitled: Giga POWER Protocol Processor Product Preview. 4 pages, printed Nov. 25, 1998.

"Toshiba Delivers First Chips to Make Consumer Devices Internet–Ready Based on iReady Design," Press Release Oct. 14, 1998. 3 pages, (printed Nov. 28, 1998).

Internet pages from website http://www.ireadyco.com/about.html, 3 pages, downloaded Nov. 2, 1998.

U.S. Appl. No. 60/053,240, by Jolitz et al. filed Jul. 18, 1997.

Zilog Product Brief entitled "Z85C30 CMOS SCC Serial Communication Controller", Zilog Inc., 3 pages (1997).

IReady News Archive, "Revolutionary Approach to Consumer Electronics Internet Connectivity Funded," San Jose, CA Nov. 20, 1997. 2 pages, printed Nov. 2, 1998.

IReady News Archive, "Seiko Instruments Inc. (SII) Introduces World's First Internet– Ready Intelligent LCD Modules Based on IReady Technology," Santa Clara, CA and Chiba, Japan, Oct. 26, 1998. 2 pages, printed Nov. 2, 1998.

Internet pages of Xpoint Technologies www.xpoint.com website, 5 pages, printed Dec. 19, 1997.

Internet pages entitled: Asante and 100BASE–T Fast Ethernet. 7 pages, printed May 27, 1997.

Internet pages entitled: A Guide to the Paragon XP/S–A7 Supercomputer at Indiana University. 13 pages, printed Dec. 21, 1998.

Richard Stevens, "TCP/IP Illustrated, vol. 1, The Protocols", pp. 325–326 (1994).

VT8501 Apollo MVP4 Documentation, VIA Technologies, Inc., pp. i–iv, 1–11, cover and copyright page, revision 1.3 (Feb. 1, 2000).

Internet pages entitled: Northridge/Southridge vs. Intel Hub Architecture, 4 pages, printed Feb. 19, 2001.

Gigabit Ethernet Technical Brief, Achieving End–to End Performance. Alteon Networks, Inc., First Edition, Sep. 1996.

Internet pages directed to; Technical Brief on Alteon Ethernet Gigabit NIC technology, www.alteon.com, 14 pages, printed Mar. 15, 1997.

Internet pages from IReady News Archives entitled, "iReady Rounding Out management team with two key executives," 2 pages, downloaded Nov. 28, 1998.

"Toshiba Delivers First Chips to Make Consumer Devices Internet–Ready Based On iReady's Design," Press Release Oct. 1988. 3 pages, downloaded Nov. 28, 1998.

Internet pages from iReady Products, web site http://www.ireadyco.com/products.html, 2 pages, downloaded Nov. 25, 1998.

IReady News Archives, "Toshiba, iReady shipping Internet chip," 1 page, posted at 9:39 AM PT, Oct. 14, 1998.

iReady Corporation, The i–1000 Internet Tuner, Modular Internet Design System, 2 pages, date unknown.

Interprophet website, http://www.interprophet.com/technology.html, 17 pages, downloaded Mar. 1, 2000.

NEWSwatch—IReady Internet Tuner to Web Enable Devices, Nov. 15, 1996. 2 pages, printed Nov. 2, 1998.

David Lammers, EETimes, Jun. 13, 1997, Tuner for Toshiba, Toshiba taps iReady for Internet tuner. 3 pages, printed Nov. 2, 1998.

Internet pages entitled: DART Fast Application—Level Networking Via Data–Copy Avoidance, by Robert J. Walsh, 25 pages. Printed Jun. 3, 1999.

Internet pages of InterProphet entitled: Frequently Asked Questions, by Lynne Jolitz, 4 pages. Printed Jun. 14, 1999.

* cited by examiner

REDUCING DELAYS ASSOCIATED WITH INSERTING A CHECKSUM INTO A NETWORK MESSAGE

CROSS-REFERENCE TO RELATED APPLICATIONS

This application is a continuation-in-part of and claims the benefit under 35 U.S.C. §120 of U.S. patent application Ser. No. 09/464,283, filed Dec. 15, 1999, by Laurence B. Boucher et al., now U.S. Pat. No. 6,427,173, which in turn is a continuation-in-part of and claims the benefit under 35 U.S.C. §120 of U.S. patent application Ser. No. 09/439,603, filed Nov. 12, 1999, by Laurence B. Boucher et al., now U.S. Pat No. 6,247,060, which in turn claims the benefit under 35 U.S.C. §119(e)(1) of the Provisional Application Ser. No. 60/061,809, filed on Oct. 14, 1997. This application also is a continuation-in-part of and claims the benefit under 35 U.S.C. §120 of U.S. patent application Ser. No. 09/384,792, filed Aug. 27, 1999, now U.S. Pat. No. 6,434,620, which in turn claims the benefit under 35 U.S.C. § 119(e)(1) of the Provisional Application Ser. No. 60/098,296, filed Aug. 27, 1998. This application also is a continuation-in-part of and claims the benefit under 35 U.S.C. §120 of U.S. patent application Ser. No. 09/067,544, filed Apr. 27, 1998, now U.S. Pat. No. 6,226,880. The subject matter of all the above-identified patent applications, and of the two above-identified provisional applications, is incorporated by, reference herein.

BACKGROUND INFORMATION

FIG. 1 (Prior Art) is a simplified diagram of a TCP packet. FIG. 2 is a simplified diagram of a network interface card (NIC) 100 card called an intelligent network interface card (INIC). One of the operations the INIC performs is to read data for a TCP packet out of host memory 101 on a host computer 102 and to transmit that data as the data payload of a TCP message onto a network 107.

A difficulty associated with performing this operation quickly is that the checksum of the TCP packet is located near the front of the packet before the data payload. The checksum is a function of all the data of the data payload. Consequently all the data of the payload must generally be transferred to the INIC 100 before the checksum can be generated. Consequently, in general, all the data of the payload is received onto the INIC card, the checksum 104 is generated, the checksum 104 is then combined with the data payload in DRAM 105 to form the complete TCP packet 106, and the complete TCP packet 106 is then transferred from DRAM 105 to the network 107.

FIG. 2 illustrates this flow of information. Arrow 108 illustrates the flow of data from host memory 101 and across PCI bus 103 to DRAM 105 located on INIC card 100. While the data is being transferred, processor 109 on INIC card 100 builds the TCP header 110 in faster SRAM 111. The TCP header is formed in SRAM 111 rather than DRAM 105 because processor 109 needs to perform multiple operations on the header 110 as it is assembled and doing such multiple operations from relatively slow DRAM would unduly slow down processor 109. When all the data has been received onto the INIC 100, processor 109 is able to determine the checksum 104. The complete TCP header 110 including the correct checksum 104 is at that point residing in SRAM 111. Arrow 112 represents the assembly and writing of the complete header 110 from processor 109 to SRAM 111.

Once the complete header 110 is assembled, it is transferred from SRAM 111 to DRAM 105 in a relatively slow write to DRAM 105. Arrow 113 illustrates this transfer. Once the complete TCP packet 106 is assembled in DRAM 105, the complete packet 106 is output from DRAM 105 to the network 107. In the example of FIG. 2, this transfer is represented by arrow 114.

Unfortunately, the writing to DRAM 105 is often a relatively slow process and this writing can only begin once all the data has been received onto the INIC card. The result is an undesirable latency in the outputting of the TCP packet onto the network. A solution is desired.

SUMMARY

A first partial checksum for the header portion of a TCP header is generated on an intelligent network interface card (INIC) before all the data of the data payload of the TCP message has been transferred to the INIC. A pseudopacket with the first partial checksum and the data is assembled in DRAM on the INIC as the data arrives onto the INIC. When the last portion of the data of the data payload is received onto the INIC, a second partial checksum for the data payload is generated. This second partial checksum is not, however, written into DRAM. Rather, the pseudopacket is read out of DRAM for transfer to the network and while the pseudopacket is being transferred the second partial header is combined with the first partial header such that the resulting final TCP checksum is inserted into the pseudopacket. The pseudopacket is therefore converted into a complete TCP packet with a correct checksum as it is output from the INIC to the network.

In this way, the slow write to DRAM of the complete TCP header after the payload has already been transferred to DRAM is avoided. Rather than generating the complete TCP checksum and taking the time to write it into DRAM, the complete TCP checksum is generated on the fly as the pseudopacket is transferred from DRAM to the network.

This summary does not purport to define the invention. The claims, and not this summary, define the invention.

DETAILED DESCRIPTION OF THE PREFERRED EMBODIMENTS

Figures 1, 2:
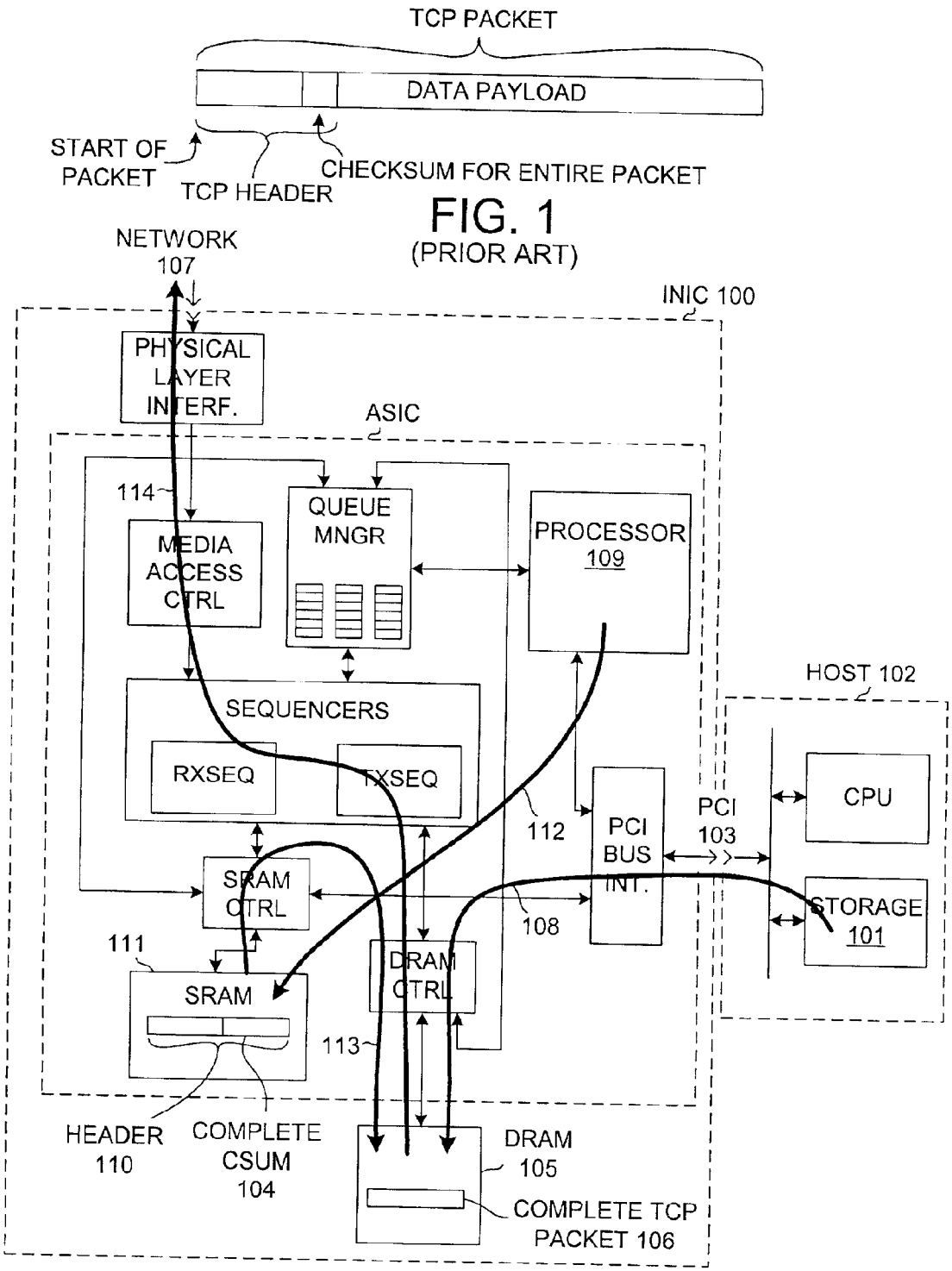
FIG. 1 is a simplified diagram of a TCP packet.
FIG. 2 is a diagram used in explaining the background of the invention.
Figure 3:
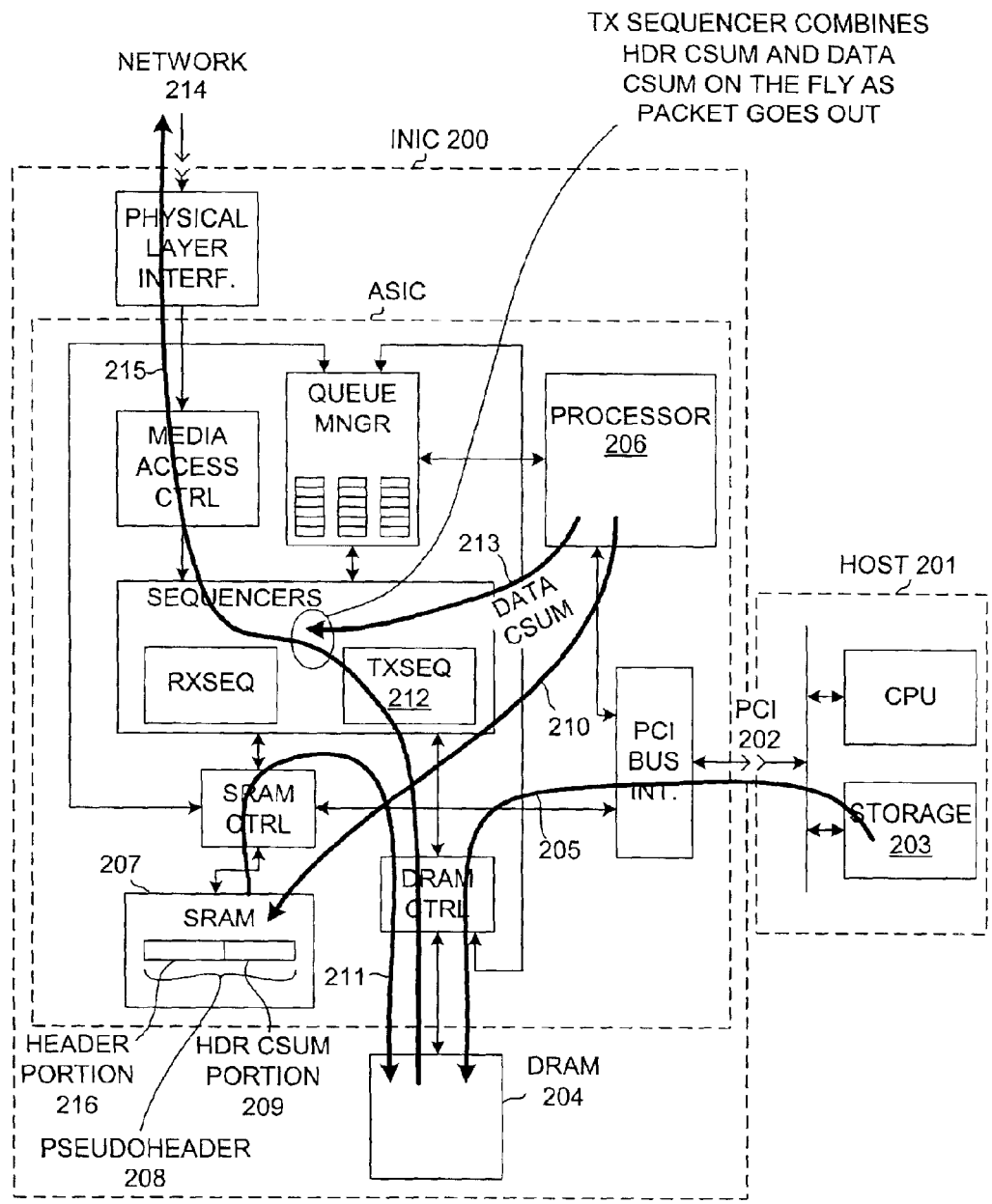
FIG. 3 is a diagram of an intelligent network interface card (INIC) in accordance with an embodiment of the present invention.

FIG. 3 is a diagram of an intelligent network interface card (INIC) 200 in accordance with one embodiment of the present invention. INIC 200 is coupled to host computer 201 via PCI bus 202. For additional information on INIC 200, see U.S. patent application Ser. No. 09/464,283, filed Dec. 15, 1999 (the subject matter of which is incorporated herein by reference).

Figure 4:
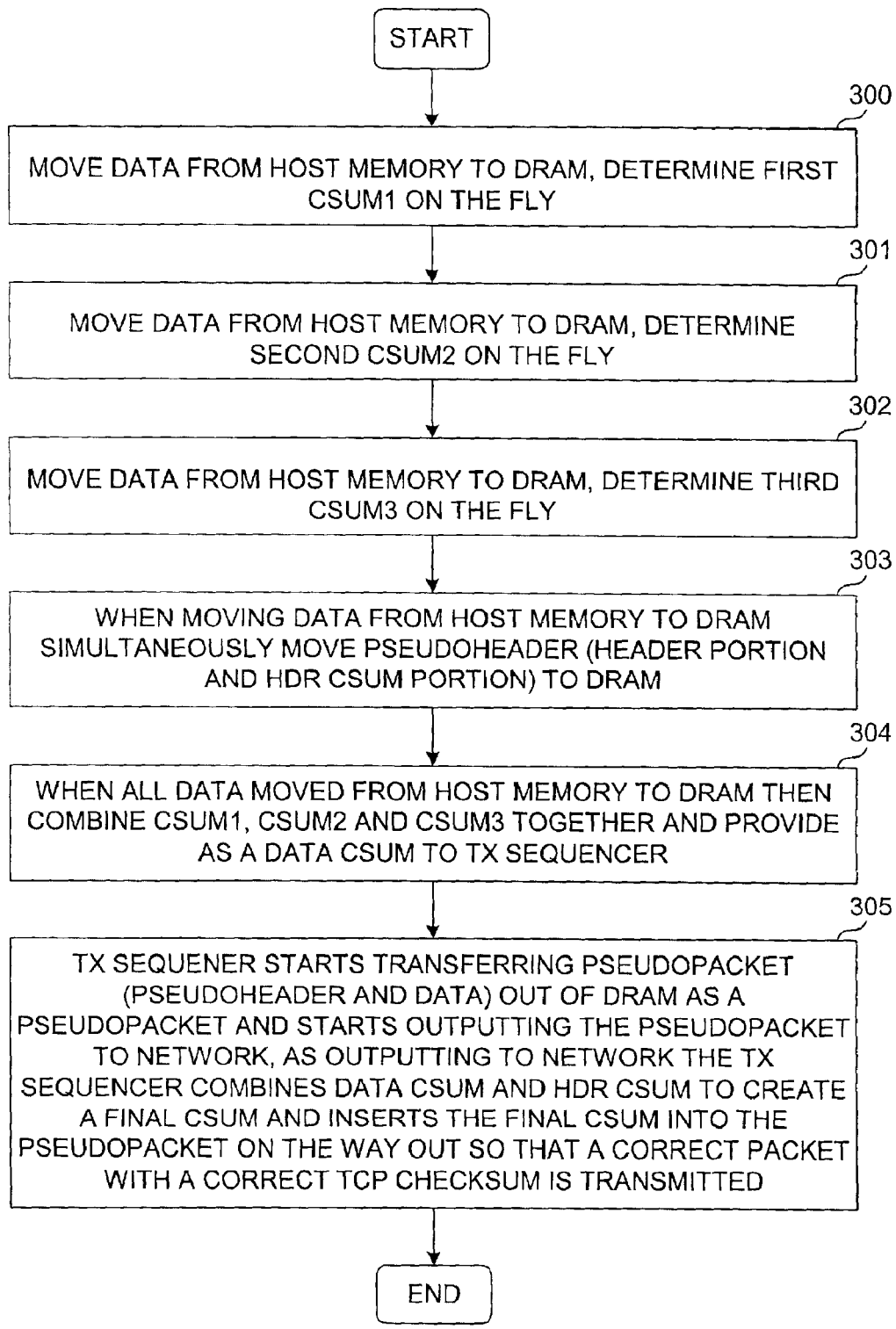
FIG. 4 is a diagram of a method in accordance with an embodiment of the present invention.

FIG. 4 is a flow chart that illustrates a method in accordance with an embodiment of the invention. In step 300, data from host memory that is to make up a part of the payload of a TCP message is transferred from host memory 203 to DRAM 204 via PCI bus 202. Hardware in the path of this data determines a first checksum CSUM1 on the fly as the data passes by. This flow of data from host memory 203 to DRAM 204 is indicated on FIG. 3 by arrow 205.

Although it could be in some situations, in the presently described example not all the data that will make up the TCP data payload is present in the same place in host memory 203. Consequently, the flow of data for the data payload from host memory 203 to DRAM 204 occurs in multiple different data moves as the various different pieces of the data are located and transferred to DRAM 204.

In step 301, more of the data that is to make the data payload of the TCP message is moved from host memory 203 to DRAM 204. A second checksum CSUM2 is generated as the data passes through the data path. This data flow is again represented by arrow 205.

In this example, the data payload is transferred to DRAM in three pieces. In step 302, the last of the data is moved from host memory 203 to DRAM 204 and a third checksum CSUM3 associated with this data is generated.

Processor 206, before this transferring is completed, builds in SRAM 207 the TCP header 208 that is to go on the TCP message. Processor 206 does not have all the data for the TCP payload so it cannot determine the complete checksum for the TCP message. It does, however, generate a checksum HDR CSUM 209 for the remainder (header portion 216) of the TCP header. This HDR CSUM is a partial checksum. Arrow 210 in FIG. 3 illustrates the building of the pseudoheader 208 (header portion 216 and partial checksum HDR CSUM 209) in SRAM 207.

In step 303, while the data payload is being transferred from host memory 203 to DRAM 204 in steps 301–302, the TCP header with the partial checksum HDR CSUM is moved from SRAM 207 to DRAM 204. This transfer is illustrated in FIG. 3 by arrow 211.

In step 304, after all the data for the data payload has been transferred such that checksums for all the various pieces of the data payload have been generated, processor 206 combines those various data checksums together to form a single checksum for the data payload. In this example, there are three data checksums CSUM1, CSUM2 and CSUM 3. These are combined together to make a single data checksum DATA CSUM for the data payload. Processor 206 then supplies this DATA CSUM to a transmit sequencer 212. For additional details on one particular example of a transmit sequencer, see U.S. patent application Ser. No. 09/464,283 (the subject matter of which is incorporated herein by reference). The supplying of the DATA CSUM to transmit sequencer 212 is illustrated in FIG. 3 by arrow 213. At this point, the data payload is present in one place in DRAM 204 in assembled form with the pseudoheader 208 (header portion 216 and HDR CSUM 209) that was transferred from SRAM 207 to DRAM 204 in step 303. This assembly is a pseudopacket (pseudoheader and data payload). It is complete but for the fact that the header does not contain a complete checksum but rather contains the partial checksum HDR CSUM 209.

In step 305, the transmit sequencer 212 begins transferring the pseudopacket out of DRAM 204 for transmission onto a network 214. Network 214 is, in one embodiment, a local area network (LAN). Transmit sequencer 212 combines the DATA CSUM with the HDR CSUM to create a final checksum and inserts the final checksum into the pseudopacket as the pseudopacket passes over path 215 from DRAM 204 to network 214. What is transferred onto network 214 is therefore a TCP packet having a correct TCP header with a correct checksum.

Although the functionality of the INIC is described here as being carried out on a separate card, it is to be understood that in some embodiments the functionality of the INIC is carried out on the host computer itself, for example on the motherboard of the host computer. Functionality of the INIC can be incorporated into the host such that payload data from host memory does not pass over a bus such as the PCI bus, but rather the INIC functionality is incorporated into the host in the form of an I/O integrated circuit chip or integrated circuit chip set that is coupled directly to the host memory bus. The I/O integrated circuit chip has a dedicated hardware interface for network communications. Where the INIC functionality is embodied in such an I/O integrated circuit chip, payload data from host memory is transferred to the network from the host memory by passing through the host's local bus, onto the I/O integrated circuit chip, and from the I/O integrated circuit chip's network interface port substantially directly to the network (through a physical layer interface device (PHY)) without passing over any expansion card bus.

Although the present invention has been described in connection with certain specific embodiments for instructional purposes, the present invention is not limited thereto. The present invention extends to packet protocols other than the TCP protocol. In some embodiments, the first part of the packet is output from the INIC before the final checksum is inserted into the packet. The combining of the DATA CSUM and the HDR CSUM need not be performed by a sequencer and the pseudoheader need not be created by a processor. Other types of hardware and software can be employed to carry out these functions in certain embodiments. In some embodiments, the pseudoheader is assembled in memory or registers inside processor 109 rather than in a separate memory such as SRAM 111. Accordingly, various modifications, adaptations, and combinations of various features of the described embodiments can be practiced without departing from the scope of the invention as set forth in the claims.

What is claimed is:

1. A method, comprising:
   (a) transferring a data payload from a host memory to a first memory of a network interface device;
   (b) on the network interface device and before the transferring of (a) is complete creating a pseudoheader and storing the pseudoheader in a second memory of the network interface device, the pseudoheader containing a header portion and a checksum portion, the checksum portion being a checksum of the header portion and not a checksum of the data payload;
   (c) on the network interface device and before the transferring of (a) is complete transferring the pseudoheader from the second memory to the first memory;
   (d) after (c) generating on the network interface device a checksum for the data payload; wherein the pseudoheader and the data payload together comprise a pseudopacket; and
   (e) reading the pseudoheader and at least a portion of the data payload from the first memory and combining the checksum for the header portion with the checksum for the data payload to generate a final checksum, the final checksum being inserted into the pseudopacket to form a complete TCP packet, the complete TCP packet being output from the network interface device to a network.

2. The method of claim 1, wherein the first memory is DRAM and wherein the second memory is SRAM.

3. The method of claim 1, wherein the second memory has a faster access time than the first memory.

4. The method of claim 1, wherein the network interface device is part of a host computer, the host memory being another part of the host computer.

5. An apparatus, comprising:
(a) means for transferring a data payload from a host memory to a first memory of a network interface device;
(b) means for creating, before the transferring of (a) is complete, a pseudoheader and storing the pseudoheader in a second memory of the network interface device, the pseudoheader containing a header portion and a checksum portion, the checksum portion being a checksum of the header portion and not a checksum of the data payload;
(c) means for transferring, before the transferring of (a) is complete, the pseudoheader from the second memory to the first memory;
(d) means for generating, after (c), a checksum for the data payload wherein the pseudoheader and the data payload together comprise a pseudopacket; and
(e) means for reading the pseudheader and at least a portion of the data payload from the first memory and for combining the checksum for the header portion with the checksum for the data payload to generate a final checksum, the final checksum being inserted into the pseudopacket to form a complete TCP packet, the complete TCP packet being output from the network interface device to a network.

6. The apparatus of claim 5, wherein the apparatus comprises a host computer, the network interface device being a part of the host computer, the host memory being another part of the host computer.

7. The apparatus of claim 5, wherein the means for reading includes a sequencer, and wherein the means for creating includes a processor.

* * * * *